(12) United States Patent
Iida et al.

(10) Patent No.: US 8,390,803 B2
(45) Date of Patent: Mar. 5, 2013

(54) CALIBRATION DEVICE AND OPTICAL CHARACTERISTIC MEASURING SYSTEM USING THE SAME

(75) Inventors: Shinichi Iida, Sakai (JP); Wataru Yamaguchi, Sakai (JP)

(73) Assignee: Konica Minolta Sensing, Inc., Osaka (JP)

( * ) Notice: Subject to any disclaimer, the term of this patent is extended or adjusted under 35 U.S.C. 154(b) by 290 days.

(21) Appl. No.: 12/953,056

(22) Filed: Nov. 23, 2010

(65) Prior Publication Data

US 2011/0128540 A1    Jun. 2, 2011

(30) Foreign Application Priority Data

Nov. 27, 2009  (JP) .................................. 2009-270407
Sep. 28, 2010  (JP) .................................. 2010-216819

(51) Int. Cl.
*G01J 1/10*     (2006.01)
*G01J 3/42*     (2006.01)

(52) U.S. Cl. ..................... 356/243.1; 356/319; 356/326

(58) Field of Classification Search .................. 356/319, 356/326, 328, 243.1, 243.4, 243.5, 243.8
See application file for complete search history.

(56) References Cited

U.S. PATENT DOCUMENTS

| | | | | |
|---|---|---|---|---|
| 6,657,722 B1 * | 12/2003 | Nagayoshi | ..................... | 356/326 |
| 6,876,448 B2 * | 4/2005 | Imura et al. | ..................... | 356/326 |
| 7,116,417 B2 * | 10/2006 | Imura | ..................... | 356/326 |
| 7,151,600 B2 * | 12/2006 | Imura | ..................... | 356/326 |
| 7,385,701 B2 * | 6/2008 | Watanabe et al. | ..................... | 356/402 |
| 8,144,322 B2 * | 3/2012 | Nagashima et al. | ..................... | 356/326 |

FOREIGN PATENT DOCUMENTS

JP     2002-243550     8/2002

* cited by examiner

*Primary Examiner* — Layla Lauchman
(74) *Attorney, Agent, or Firm* — Brinks Hofer Gilson & Lione

(57) ABSTRACT

A calibration device 21 according to the present invention is a member used for white calibration of an optical characteristic measuring apparatus 1 for measuring an optical characteristic of a specimen arranged to close a measuring opening and is used together with a spacer 24. Accordingly, such a calibration device 21 can perform more accurate white calibration by preventing formation of an interference pattern by the spacer 24.

20 Claims, 20 Drawing Sheets

CALIBRATION DEVICE AND OPTICAL CHARACTERISTIC MEASURING SYSTEM USING THE SAME

This application is based on Japanese Patent Application No. 2009-270407 filed on Nov. 27, 2009 and Japanese Patent Application No. 2010-216819 filed on Sep. 28, 2010, the contents of which are hereby incorporated by reference.

BACKGROUND OF THE INVENTION

1. Field of the Invention

The present invention relates to a calibration device used for white calibration of an optical characteristic system measuring apparatus and an optical characteristic measuring system including this calibration device and the optical characteristic measuring apparatus and particularly to various spectrophotometers and color-difference meters of, e.g. so-called top port type or handy type suitably used as the optical characteristic measuring apparatus.

2. Description of the Background Art

A conventional optical characteristic measuring apparatus is described below, taking an apparatus of the top port type as an example. A typical prior art of the above top port type optical characteristic measuring apparatus was proposed in Japanese Unexamined Patent Publication 2002-243550 (document D1). A structure of a present spectrophotometer 100 of the top port type which was improved based on technology disclosed in document D1 is shown in FIGS. 15 and 16. FIG. 15 is a horizontal sectional view of the spectrophotometer 100 and FIG. 16 is a vertical sectional view thereof. This spectrophotometer 100 includes a measuring port (measuring opening) 103 which is so formed as to continuously extend through a ceiling plate 101a of a housing and a ceiling surface of an integrating sphere 102, and measures an optical characteristic such as color of a specimen 104 arranged to close the measuring port 103.

Thus, a xenon lamp 110 as a light source and an optical fiber 106 for measuring the light source are provided on one surface of the integrating sphere 102, a receiving optical system 108 is facing an opening 107 formed in one lateral surface, and a mirror 109 for forming an optical path between the measuring port 103 and the opening 107 is provided in a central part of the integrating sphere 102. Illumination light from the xenon lamp 110 is emitted into the integrating sphere 102 to be scattered in the integrating sphere 102 and illuminate the specimen 104 arranged on the measuring port 103. Reflected light from the illuminated specimen 104 is incident on the receiving optical system 108 through the opening 107 via the mirror 109, a reflected light intensity signal is obtained by a light receiver of the receiving optical system 108, and the color of the specimen 104 is measured by an arithmetic control unit based on the reflected light intensity signal. Further, the spectral intensity of the illumination light itself is obtained as a reference light intensity signal when the illumination light is incident on the receiving optical system 108 from the optical fiber 106 with the measuring port 103 closed.

Since being of the top port type, the spectrophotometer 100 constructed as described above can measure reflected light intensity by directly placing a specimen 104a such as a large fruit, which will substantially close the measuring port 103, on the measuring port 103 as shown in FIG. 17 and can measure reflected light intensities of specimens such as granules, powders and liquids using a transparent plate such as a dish 104c as shown in FIGS. 18 and 19A.

In the case of performing white calibration (calibration with an input of 100%) of such a spectrophotometer 100, a calibration device 111 shown in FIG. 20 has been conventionally used. As described above, since not only the specimen 104a is directly placed on the measuring port 103, but also the specimen 104b is indirectly placed thereon using the transparent plate such as the dish 104c, this calibration device 111 is composed of a white calibration plate 112 and a dummy transparent plate 113 formed to have the same material and thickness as the dish 104c.

Calibrations include zero calibration (calibration with an input of 0%) performed with a dark-room environment set in the integrating sphere 102. In this case, a cylindrical zero calibration box 141 as shown in FIG. 21 is used. This zero calibration box 141 includes a cylindrical portion 142, which will surround the measuring port 103, and a conical member 143 provided to close the leading end of the cylindrical portion 142, and inside of the zero calibration box 141 is black which absorbs the light. This zero calibration box 141 scatters light incident through the measuring port 103 by the conical member 143 and absorbs the light by the inner circumferential surface of the cylindrical portion 142 having a predetermined length. In the case of this zero calibration, after the dummy transparent plate 113 of the calibration device 111 is firstly placed on the measuring port 103, the zero calibration box 141 is mounted thereon as shown in FIG. 19B and zero calibration is performed.

In the above background art, white calibration is performed with the white calibration plate 112 placed on the dummy transparent plate 113 as shown in FIG. 19C following zero calibration. Thus, in the above background art, an interference pattern 115 as shown in FIG. 22 may be formed due to a difference in flatness between the dummy transparent plate 113 and the white calibration plate 112. This interference pattern 115 differs depending on how the white calibration plate 112 is placed on the dummy transparent plate 113 and adversely affects white calibration accuracy.

Such an inconvenience could occur not only in apparatuses of the top port type, but also in optical characteristic measuring apparatuses of other types. For example, there are cases where a transparent member is mounted to cover a measuring opening to prevent entrance of powder or the like through the measuring opening, for example, in the case of measuring the powder or the like in a handy type apparatus. In white calibration performed prior to a measurement of the powder or the like using the handy type apparatus, a transparent member of the handy type apparatus is placed on a white calibration plate. Thus, an interference pattern may be similarly formed due to a difference in flatness between the transparent member and the white calibration plate, which adversely affects white calibration accuracy.

SUMMARY OF THE INVENTION

The present invention was developed in view of the above situation and an object thereof is to provide a calibration device capable of performing more accurate white calibration by preventing formation of an interference pattern when white calibration is performed by combining a white calibration plate with a transparent plate, and an optical characteristic measuring system using the same.

A calibration device according to one aspect of the present invention is a member used for white calibration of an optical characteristic measuring apparatus for measuring an optical characteristic of a specimen arranged to close a measuring opening, and is used together with a spacer. Thus, such a calibration device can perform more accurate white calibration by preventing formation of an interference pattern by the spacer.

These and other objects, features and advantages of the present invention will become more apparent upon reading the following detailed description along with the accompanying drawings.

MODES FOR CARRYING OUT THE INVENTION

Figure 1:
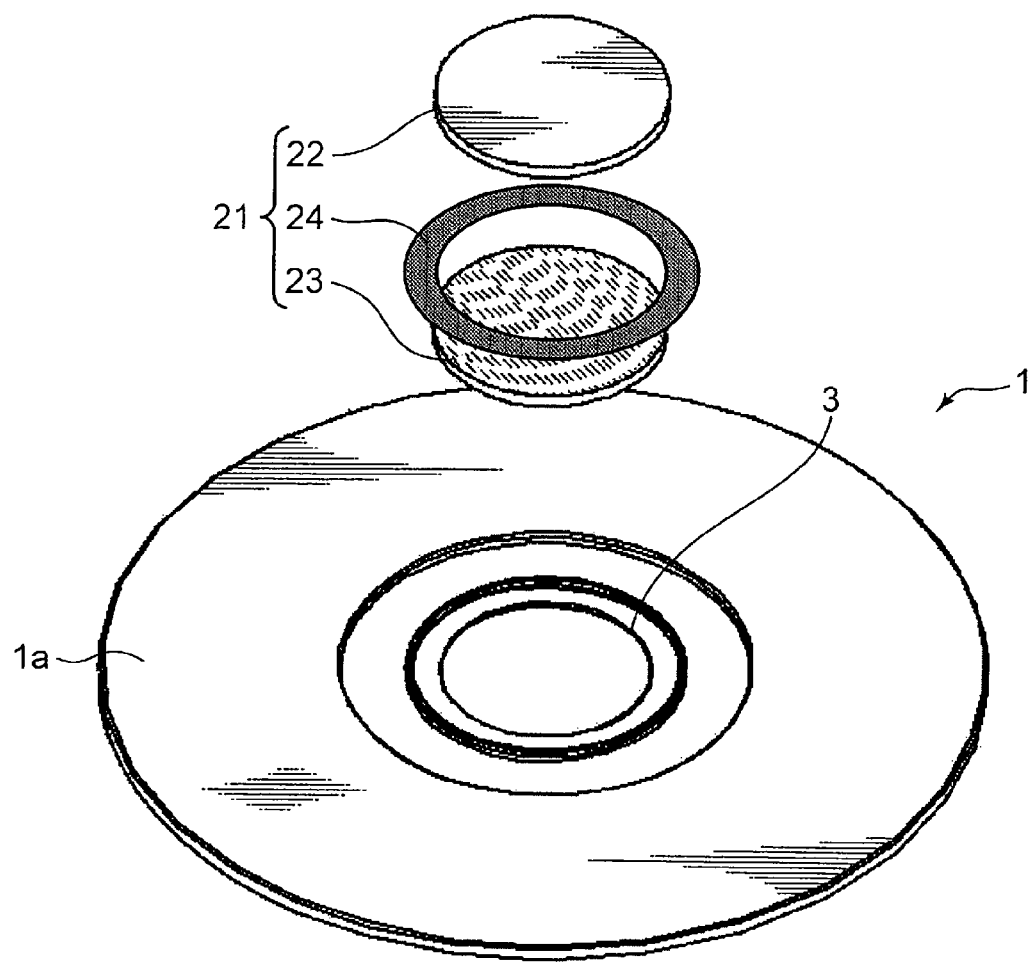
FIG. 1 is an exploded perspective view of a calibration device according to a first embodiment of the present invention.

Hereinafter, embodiments of the present invention are described with reference to the drawings. Note that constructions denoted by the same reference numerals in the respective drawings are same and not repeatedly described unless necessary. In this specification, constructions are denoted by reference numerals without any suffixes in the case of being collectively termed while being denoted by reference numerals with suffixes in the case of being individually termed.

(First Embodiment)

Figure 2:
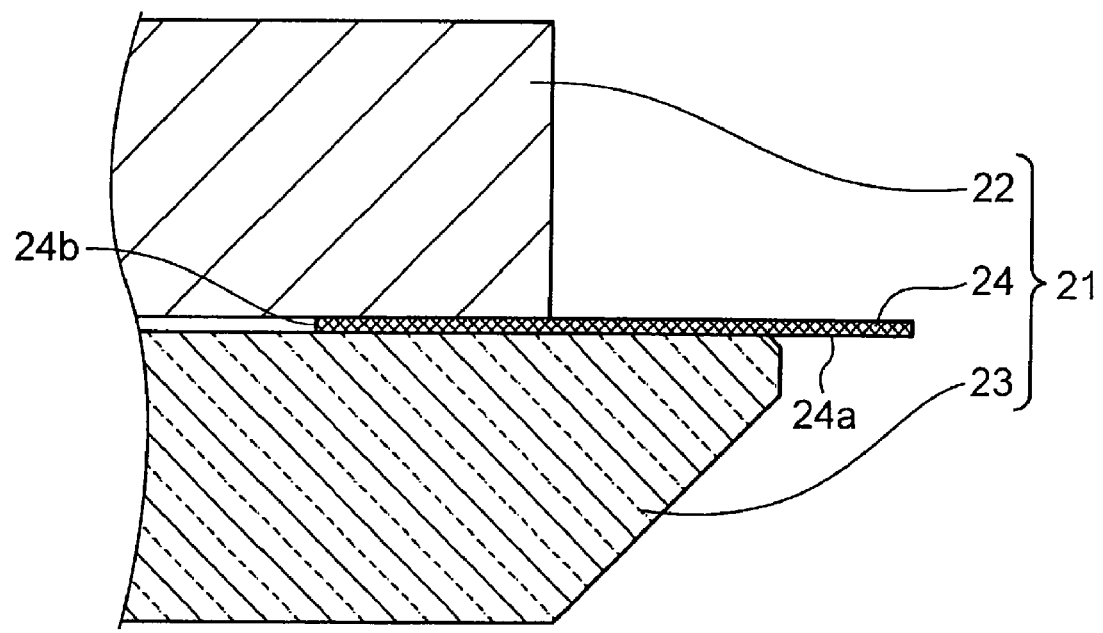
FIG. 2 is a partial vertical sectional view showing a construction of the calibration device shown in FIG. 1.
Figure 3:
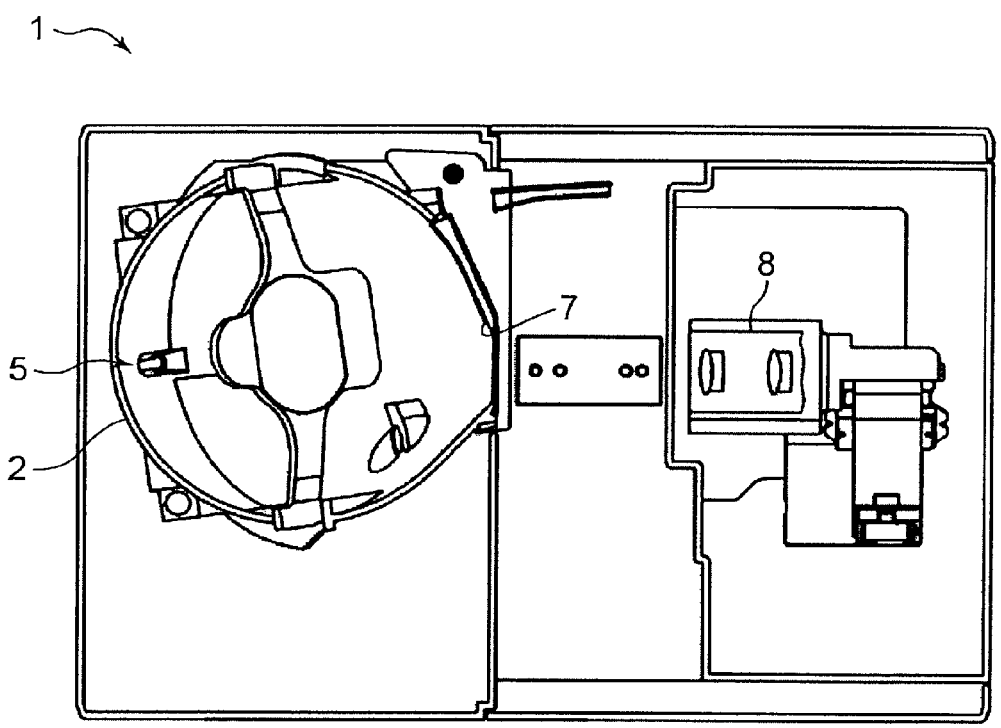
FIG. 3 is a horizontal sectional view showing a structure of a spectrophotometer of the top port type using the calibration device shown in FIG. 1.
Figure 4:
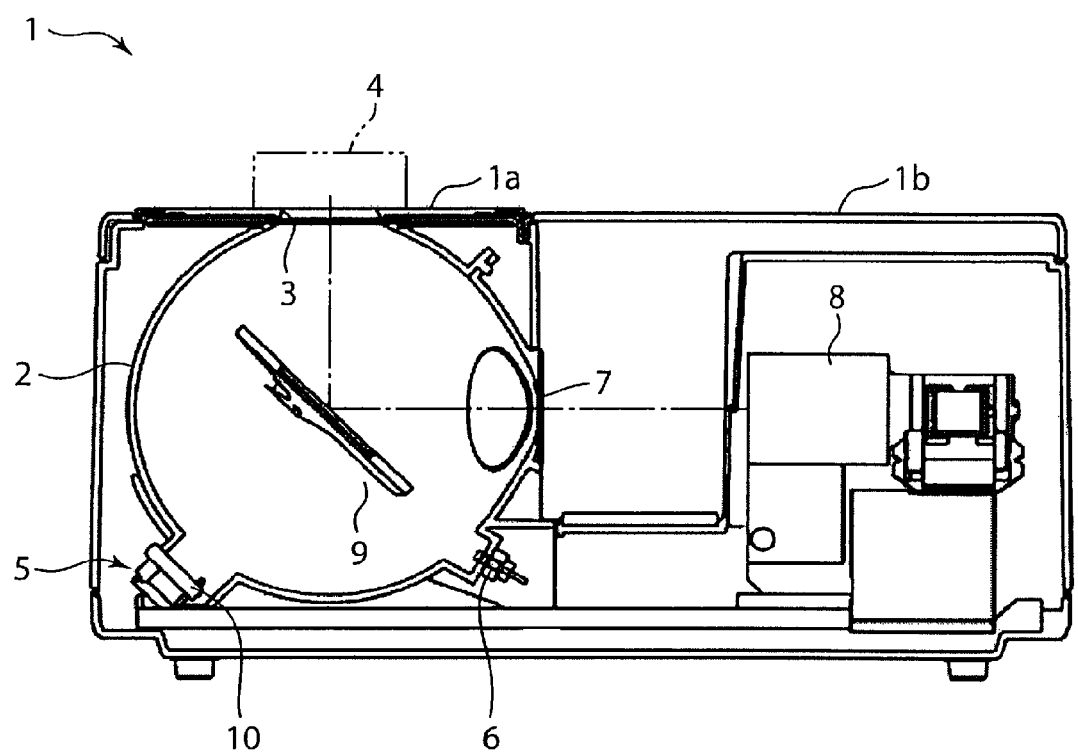
FIG. 4 is a vertical sectional view showing a structure of the spectrophotometer shown in FIG. 3.

FIG. 1 is an exploded perspective view of a calibration device according to a first embodiment of the present invention. FIG. 2 is a partial vertical sectional view showing a construction of the calibration device shown in FIG. 1. FIG. 3 is a horizontal sectional view showing a structure of a spectrophotometer of the top port type using the calibration device shown in FIG. 1. FIG. 4 is a vertical sectional view showing a structure of the spectrophotometer shown in FIG. 3.

The calibration device 21 of this embodiment shown in FIGS. 1 and 2 is used in the spectrophotometer 1 of the top port type shown in FIGS. 3 and 4.

This spectrophotometer 1 of the top port type includes an integrating sphere 2, a light source 5, a receiving optical system 8 and a housing 1b having these integrating sphere 2, light source 5 and receiving optical system 8.

The housing 1b includes a ceiling plate 1a and is formed with a measuring port (measuring opening) 3 which continuously extends through the ceiling plate 1a and the ceiling surface of the integrating sphere 2. A specimen 4 to be measured is so arranged as to close the measuring port 3 formed in the integrating sphere 2 and has an optical characteristic thereof such as color measured. A xenon lamp 10 as an example of the light source 5 and an optical fiber 6 for measuring the light source are provided on one surface of the integrating sphere 2. An opening 7 is formed in one lateral surface of the integrating sphere 2. The receiving optical system 8 is so arranged in the housing 1b as to face this opening 7. Further, a mirror 9 for forming an optical path between the measuring port 3 and the opening 7 is disposed in a central part of the integrating sphere 2.

In the spectrophotometer 1 constructed as above, illumination light from the xenon lamp 10 is emitted into the interior of the integrating sphere 2 to be scattered in the integrating sphere 2 and illuminate the specimen 4 arranged on the measuring port 3. Reflected light from the illuminated specimen 4 is incident on the receiving optical system 8 through the opening 7 via the mirror 9 and a reflected light intensity signal is obtained by a light receiver of the receiving optical system 8. The color of the specimen 4 is measured by an unillustrated arithmetic control unit based on this reflected light intensity signal. The arithmetic control unit may be provided in the spectrophotometer 1 or may be realized by a computer such as a personal computer installed outside the spectrophotometer 1 and connected to the spectrophotometer 1. Further, the spectral intensity of the illumination light itself is obtained as a reference light intensity signal when the illumination light is incident on the receiving optical system 8 from the optical fiber 6 with the measuring port 3 closed.

Also in such a spectrophotometer 1, not only a specimen 104a is directly placed on the measuring port 3, but also reflected light intensity of a specimen 104b such as granules, powder or liquid can be measured using a transparent member such as a dish 104c as described in the section on the background art. Further, zero calibration can be performed by mounting a zero calibration box 141 after the transparent member is placed on the measuring port 3.

Figure 19A:
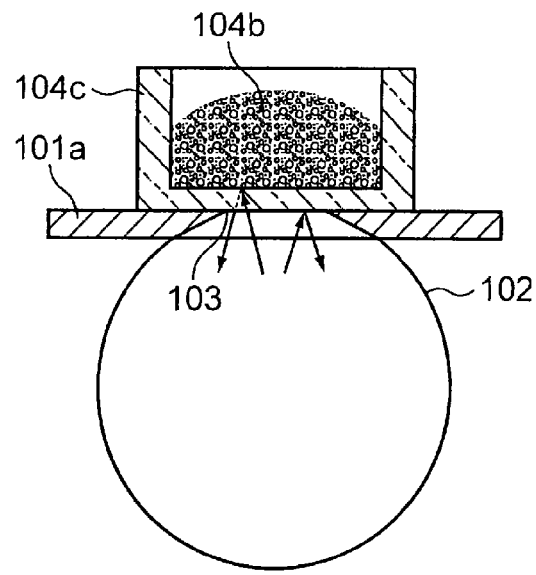
Figure 19B:
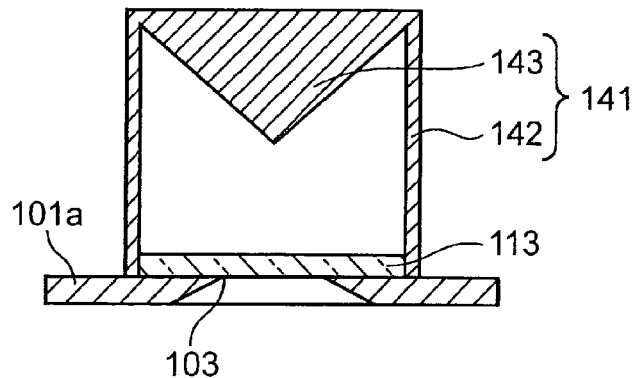
Figure 19C:
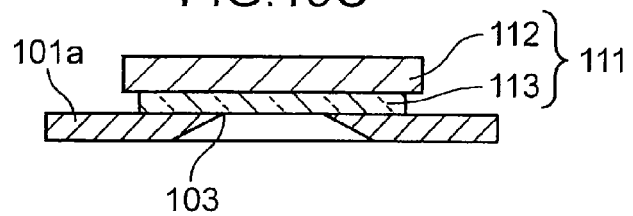
Figure 20:
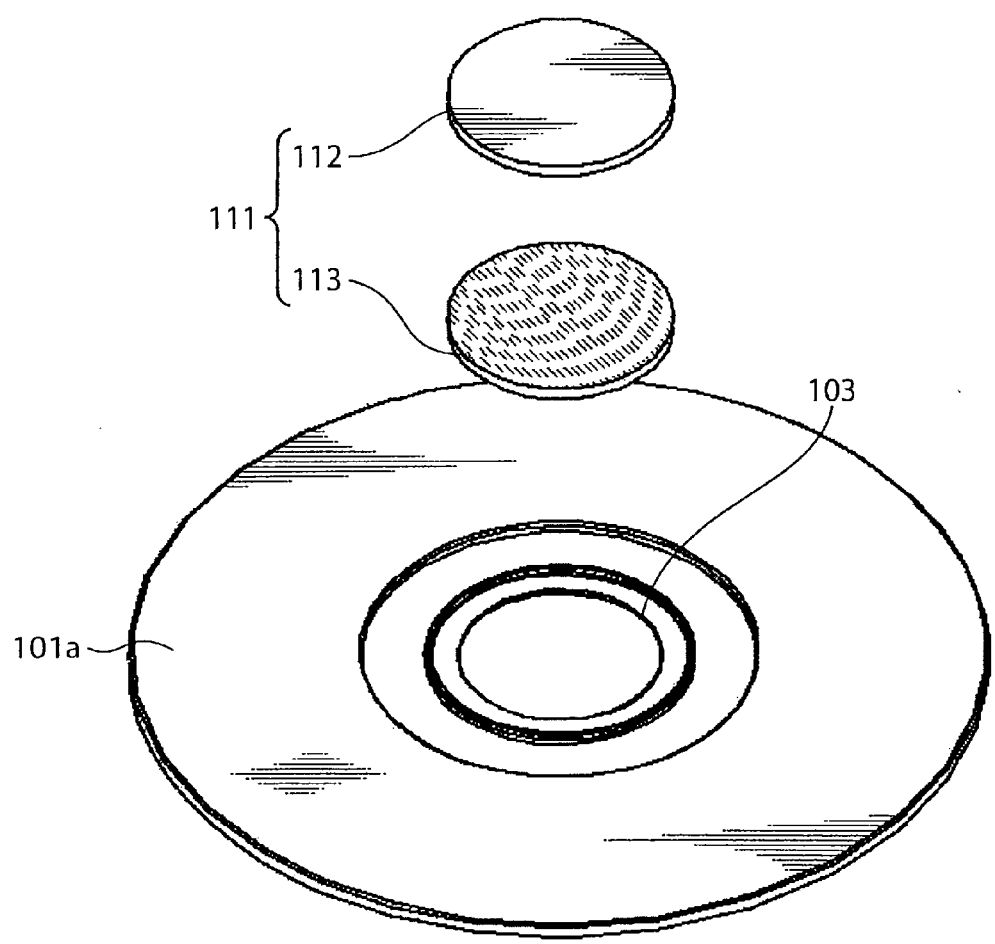
FIG. 20 is an exploded perspective view of a prior art calibration device.

The calibration device 21 used in such a spectrophotometer 1 of the top port type includes a white calibration member (for example a white calibration plate) 22, a dummy transparent plate 23 and a spacer 24 provided between these white calibration member 22 and dummy transparent plate 23 as shown in FIGS. 1 and 2. The white calibration member 22 is commonly used for white calibration before a measurement by the spectrophotometer 1 regardless of whether the measurement is performed without using the transparent member such as the dish 104c or using the transparent member. In contrast, the dummy transparent plate 23 is used for measurements performed using the transparent member such as the dish 104c and has the same material and thickness as the transparent member. This dummy transparent plate 23 can also be commonly used for zero calibration similar to the one described with reference to FIG. 19B and for white calibration described with reference to FIG. 19C. In the case of using this dummy transparent plate 23, the spacer 24 is interposed when the white calibration member 22 is mounted.

This spacer 24 is formed into a washer-shaped ring, which will extend along the outer peripheral edge of the white calibration member 22, by applying a punching process, an etching process and the like to a metal thin plate. In this embodiment, the spacer 24 is, for example, in the form of a thin plate ring having an inner diameter smaller than the outer diameter of the white calibration member 22 and an outer diameter larger than the outer diameter of the white calibration member 22. The thickness of the spacer 24 is 7 µm or more and at least a surface 24a thereof facing toward the dummy transparent plate 23 and an inner circumferential surface 24b thereof are in black for light absorption similar to the interior of the zero calibration box 141. If the white calibration member 22 and the dummy transparent plate 23 are placed one over the other without interposing such a spacer 24, an interference pattern may be formed due to a difference in flatness between the white calibration member 22 and the dummy transparent plate 23. One type of such interference patterns is called Newton's rings.

However, by interposing the spacer 24 as described above, the spacer 24 ensures a specified clearance between the white calibration member 22 and the dummy transparent plate 23 and prevents adhesion (or contact) of both when the white calibration member 22 and the dummy transparent plate 23 are used in combination, wherefore more accurate white calibration can be performed by preventing formation of an interference pattern.

Since the spacer 24 is the ring made of metal or the like, the white calibration member 22 and the dummy transparent plate 23 can be easily cleaned (defogging, fingerprint wiping, etc.) by separating the spacer 24 from them.

Further, since formation of the interference pattern can be prevented if the clearance between the white calibration member 22 and the dummy transparent plate 23 is about ten times as long as a visible wavelength, it can be reliably prevented by setting the thickness of the spacer 24 at least to 7 µm. Note that since the specimen 104 to be measured such as granules, powder or liquid is uneven, the thickness of the spacer 24 may be about 1 mm.

By making the surface 24a of the spacer 24 facing toward the dummy transparent plate 23 black to absorb light, influence by reflection on the surface 24a of the spacer 24 is minimized. By making the inner circumferential surface 24b black to absorb light, light having reached to the outer peripheral edge portion of the white calibration member 22 can be absorbed by repeating reflection between the white calibration member 22 and the dummy transparent plate 23.

Figure 5:
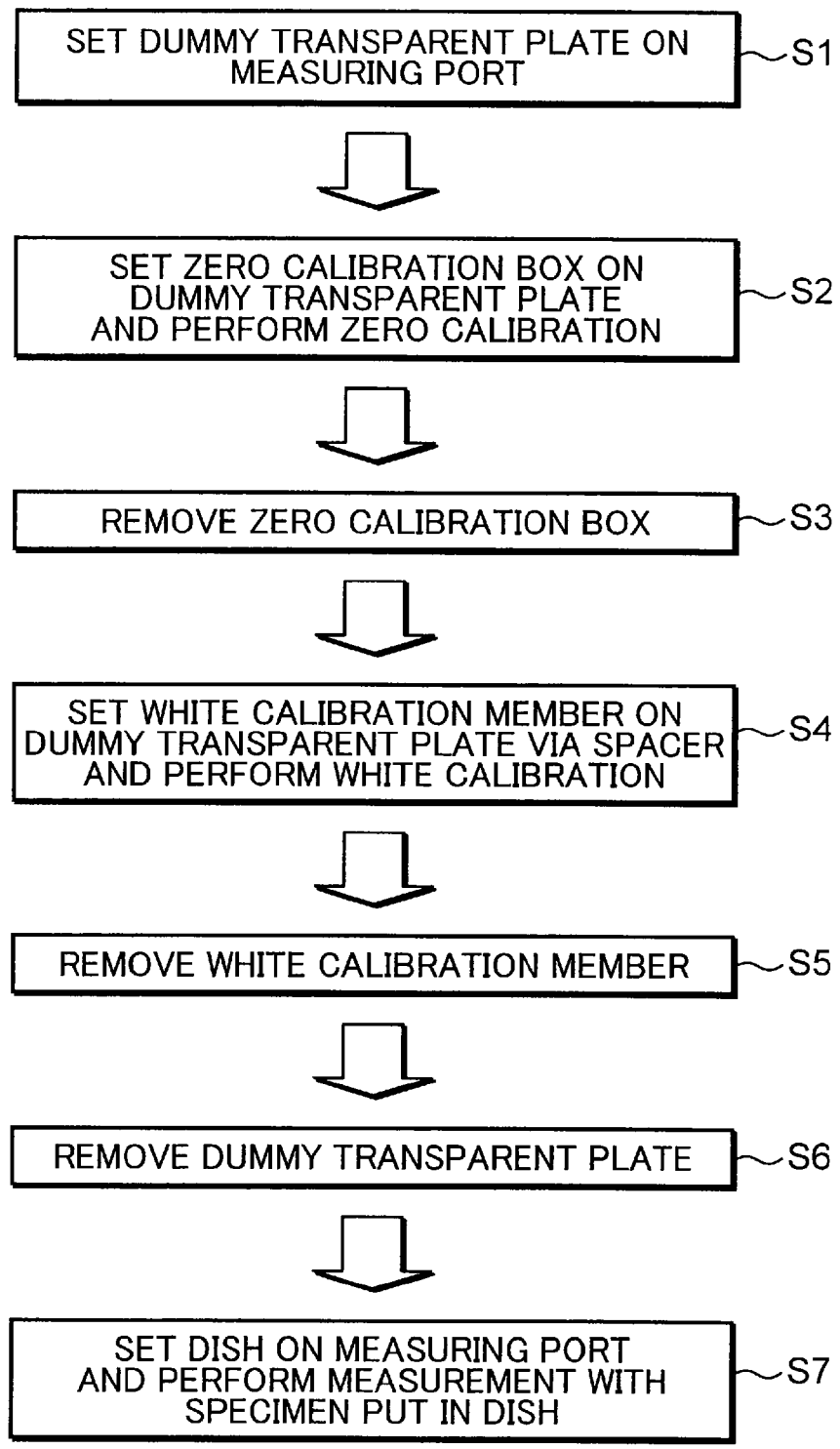
FIG. 5 is a flow chart showing a calibration method of the spectrophotometer shown in FIG. 3.

The spectrophotometer 1 performs zero calibration using the zero calibration box 141 and white calibration using the calibration device 21 prior to a measurement using the transparent member such as the dish 104c. FIG. 5 is a flow chart showing a spectroscopic measurement accompanying a calibration method in the spectrophotometer shown in FIG. 3. In FIG. 5, this measurement is assumed to be performed prior to a measurement using the dish 104c.

Figure 21:
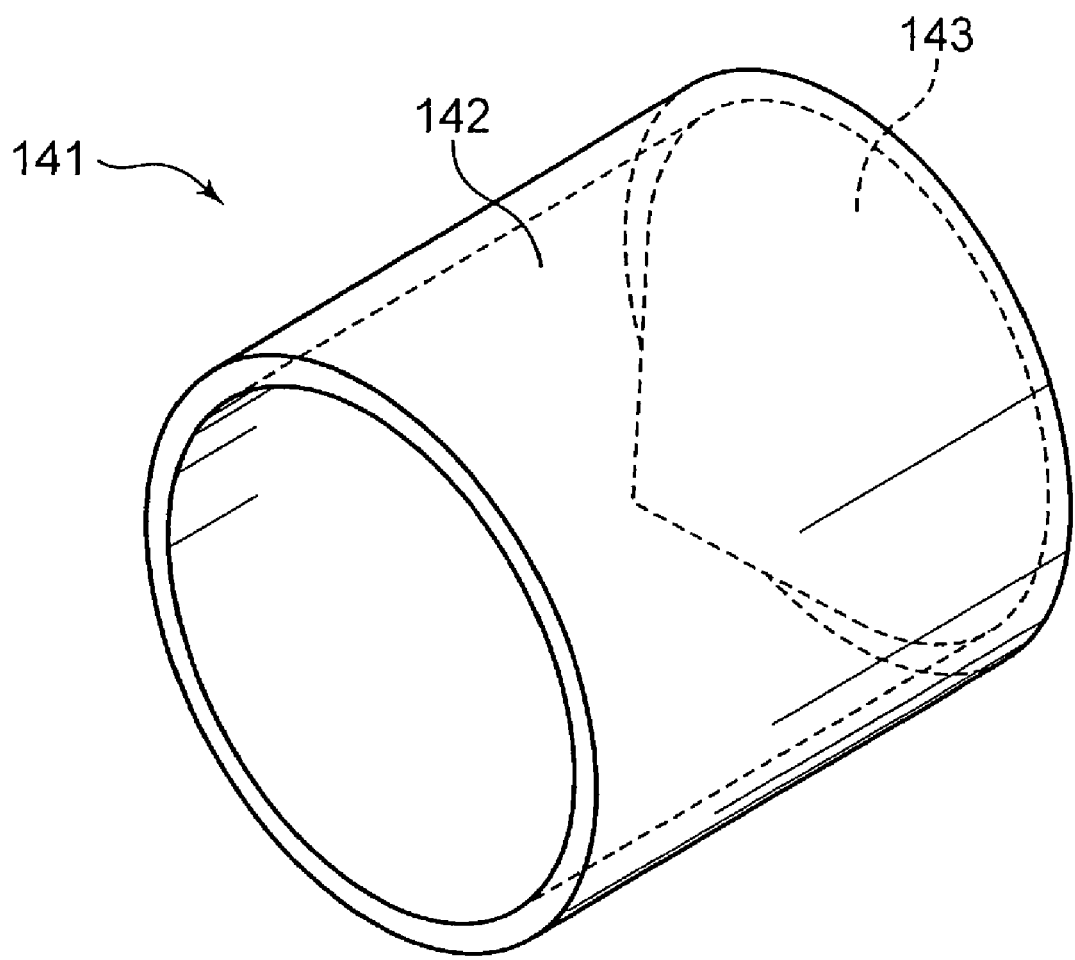
FIG. 21 is a perspective view of a zero calibration box.
Figure 22:
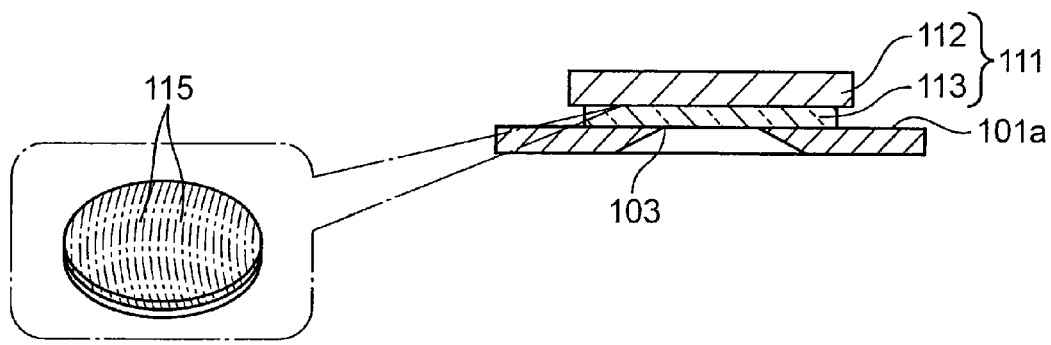
FIG. 22 is a view showing a problem caused by calibration using the calibration device shown in FIG. 20.

First of all, the dummy transparent plate 23 is set on the measuring port 3 in Step S1, and the zero calibration box 141 shown in FIG. 21 is mounted to perform zero calibration in Step S2. Thereafter, the zero calibration box 141 is removed in Step S3, and the white calibration member 22 is, instead, set above the dummy transparent plate 23 via the spacer 24 in Step S4. In other words, the spacer 24 is set on the dummy transparent plate 23, and the white calibration member 22 is set on this spacer 24. Then, white calibration is performed. Thereafter, the white calibration member 22 and the spacer 24 are removed from the measuring port 3 in Step S5, the dummy transparent plate 23 is removed from the measuring port 3 in Step S6 and the dish 104c is, instead, mounted to measure reflected light intensity of the actual specimen 104b in Step S7.

Figure 6:
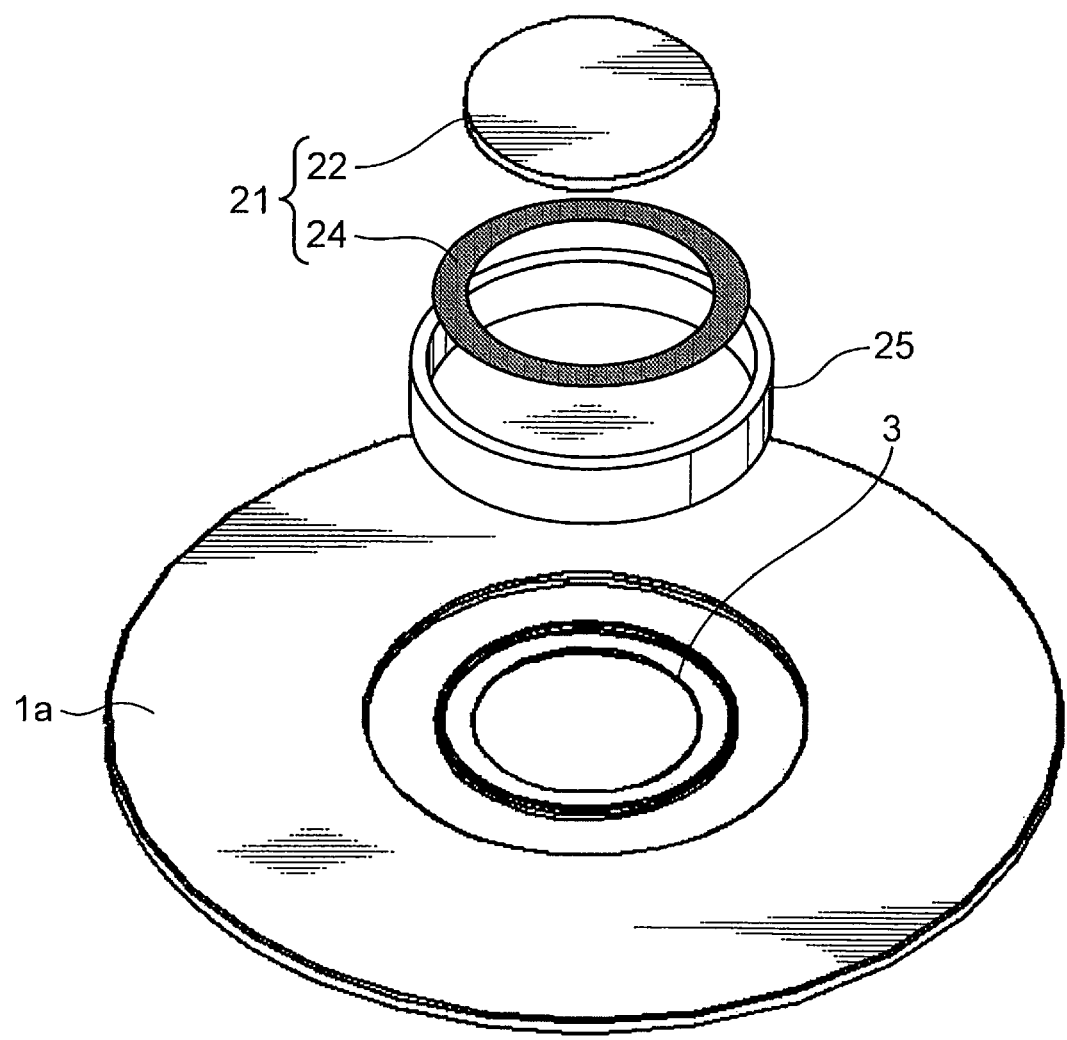
FIG. 6 is an exploded perspective view of a calibration device according to a modification of the first embodiment of the present invention.

Although the calibration device 21 includes the dummy transparent plate 23 in this embodiment, it may be composed of the white calibration member 22 and the spacer 24 without including the dummy transparent plate 23 as shown in FIG. 6. In such a construction, white calibration may be performed, for example, using the transparent member (for example a transparent plate) 25 such as the above dish 104c used for measurement of a specimen as it is instead of the dummy transparent plate 23.

Next, another embodiment is described.

(Second Embodiment)

Figure 7:
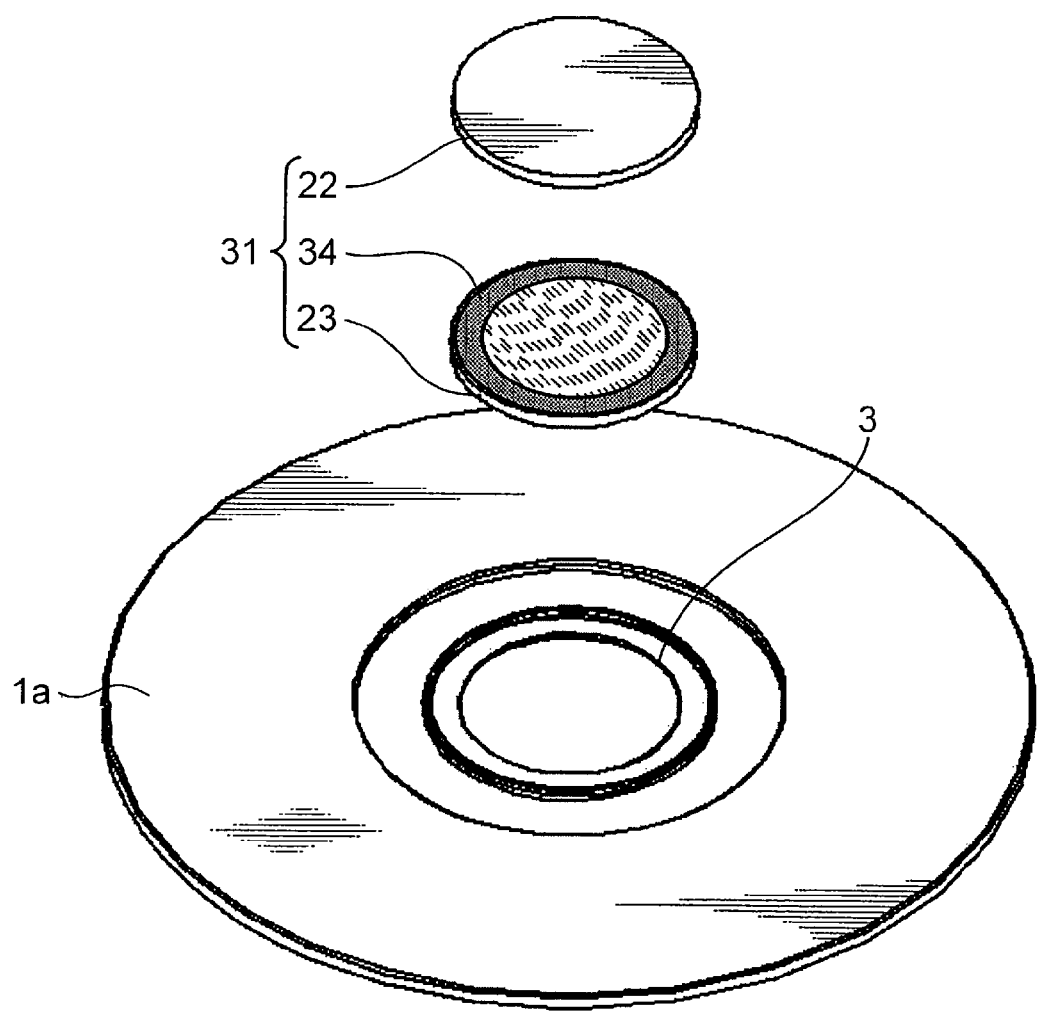
FIG. 7 is an exploded perspective view of a calibration device according to a second embodiment of the present invention.
Figure 8:
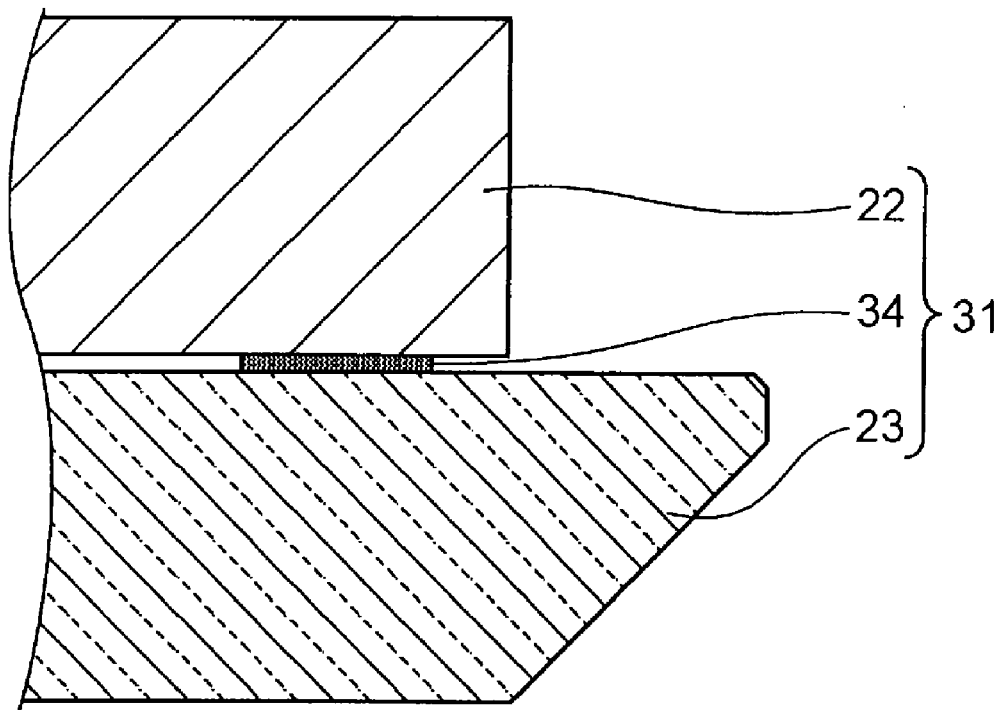
FIG. 8 is a partial vertical sectional view showing a construction of the calibration device shown in FIG. 7, FIGS. 9A and 9B are sectional views of a calibration device according to a third embodiment of the present invention.

FIG. 7 is an exploded perspective view of a calibration device according to a second embodiment of the present invention. FIG. 8 is a partial vertical sectional view showing a construction of the calibration device shown in FIG. 7. In FIGS. 7 and 8, this calibration device 31 is similar to the above calibration device 21 and corresponding parts are denoted by the same reference numerals and not described. Although a white calibration member 22 and a dummy transparent plate 23 of this calibration device 31 are similar to those of the above calibration device 21, a spacer 34 is a ring-shaped projection formed by printing on an outer peripheral edge portion of the dummy transparent plate 23 in this embodiment. For example, in this embodiment, the spacer 34 is a ring-shaped elongated projection made of a thin film. In the case of printing the spacer 34, matt black ink is used and the spacer 34 is formed to have a thickness of 7 µm or more after drying.

By employing this construction, the spacer 34 can ensure a specified clearance between the white calibration member 22 and the dummy transparent plate 23 and prevent adhesion (or contact) of both when the white calibration member 22 and the dummy transparent plate 23 are used in combination. Thus, more accurate white calibration can be performed by preventing formation of an interference pattern. Further, since the spacer 34 and the dummy transparent plate 23 are made integral to each other by printing, the loss of the spacer 34 can be prevented and the spacer 34 itself needs not have rigidity to support itself. Therefore, the spacer 34 can be formed to be thin and lightweight.

Next, another embodiment is described.

(Third Embodiment)

Figure 9A:
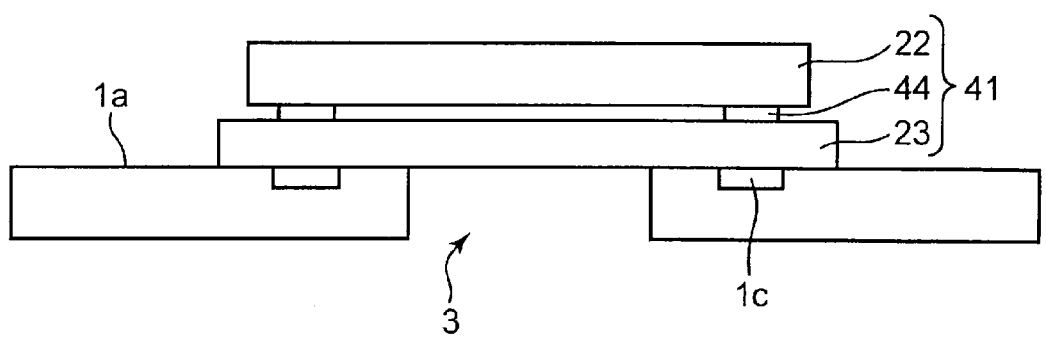
Figure 9B:
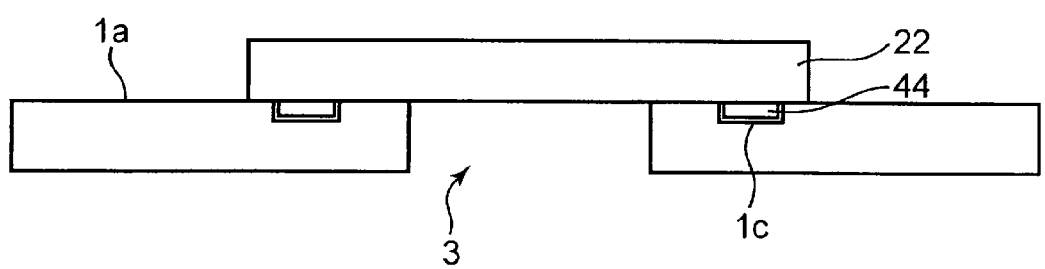

FIG. 9 are sectional views of a calibration device according to a third embodiment of the present invention. FIG. 9A shows a case of white calibration using a dummy transparent plate and FIG. 9B shows a case of white calibration using only a white calibration member. In FIG. 9, this calibration device 41 is similar to the above calibration device 21 and corresponding parts are denoted by the same reference numerals and not described. Although a white calibration member 22 and a dummy transparent plate 23 of this calibration device 41 are similar to those of the above calibration device 21, a spacer 44 is a ring-shaped projection formed by printing on an outer peripheral edge portion of the white calibration member 22 in this embodiment. For example, in this embodiment, the spacer 44 is a ring-shaped elongated projection made of a thin film. In the case of printing the spacer 44, matt black ink is used and the spacer 44 is formed to have a thickness of 7 μm or more after drying.

In the case of white calibration using the dummy transparent plate 23, as shown in FIG. 9A, the dummy transparent plate 23 is set on the measuring port 3 and the white calibration member 22 is so set on the dummy transparent plate 23 that a surface thereof formed with the spacer 44 faces toward the dummy transparent plate 23. On the other hand, in the case of white calibration when a measurement is performed with a specimen to be measured directly placed on the measuring port 3 without using the transparent member such as the dish 104c, i.e. in the case of white calibration without using the dummy transparent plate 23, the white calibration member 22 is so set on the measuring port 3 that the surface thereof formed with the spacer 44 faces toward the ceiling plate 1a of the housing 1b and the spacer 44 is accommodated in a recess 1c formed in the ceiling plate 1a of the housing 1b as shown in FIG. 9B.

Thus, in this embodiment, the recess 1c is formed in the ceiling plate 1a of the housing 1b. This recess 1c is formed to have a circular shape along a circumference surrounding the periphery of the opening of the measuring port 3 and arranged at such a position that the spacer 44 can be inserted thereinto when the white calibration member 22 is directly placed on the measuring port 3, and has a depth (height) equal to or larger than the thickness of the spacer 44. By employing this construction, the spacer 44 is accommodated into the recess 1c when the white calibration member 22 including the spacer 44 is directly mounted on the measuring port 3 without using the dummy transparent plate 23. Thus, the white calibration member 22 can be mounted on the measuring port 3 at the same position as in the case where no spacer 44 is provided. Therefore, even if the white calibration member 22 of the calibration device 41 of this embodiment is used for white calibration, influence on a measurement result caused by the fact that the position of the white calibration member 22 and the position of the specimen to be measured differ by the thickness of the spacer 44 can be maximally reduced.

Although the housing 1b is formed with the recess 1c as described above in this embodiment, the white calibration member 22 may be so set on the measuring port 3 that a surface thereof where the spacer 44 is not formed faces toward the measuring port 3 (mode in which the white calibration member 22 is used upside down). In this case, the both sides of the white calibration member 22 are white as a basis of measurement and can be used for white calibration.

Although the calibration device 41 includes the dummy transparent plate 23 in this embodiment, it may be composed of the white calibration member 22 and the spacer 44 without including the dummy transparent plate 23 as in the modification of the first embodiment described with reference to FIG. 6. In such a construction, white calibration may be performed, for example, using the transparent member such as the above dish 104c used for measurement of a specimen as it is instead of the dummy transparent plate 23.

Figure 10:
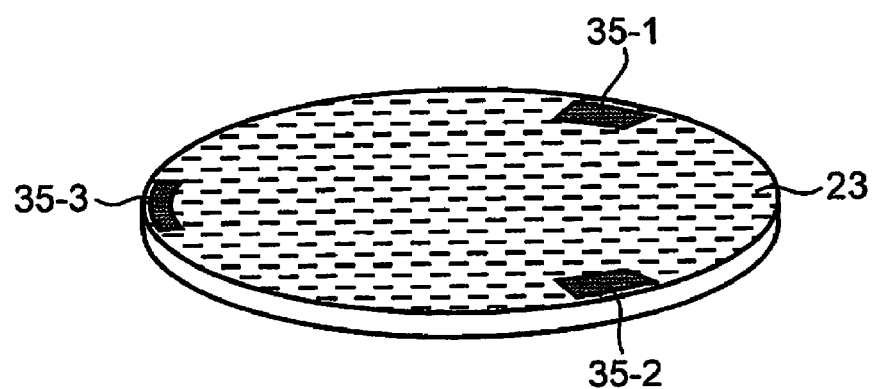
FIG. 10 is a perspective view showing a dummy transparent plate and a spacer in a calibration device according to a modification of the second embodiment of the present invention.
Figure 11:
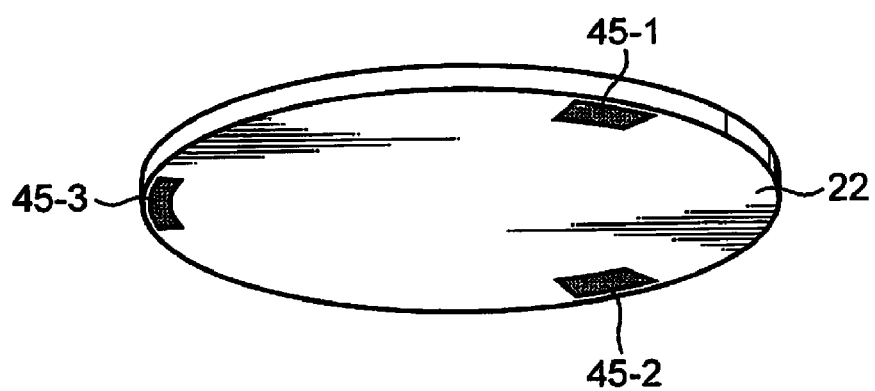
FIG. 11 is a perspective view showing a dummy transparent plate and a spacer in a calibration device according to a modification of the third embodiment of the present invention.

FIG. 10 is a perspective view showing a dummy transparent plate and a spacer of a calibration device according to a modification of the second embodiment of the present invention. FIG. 11 is a perspective view showing a white calibration member and a spacer of a calibration device according to a modification of the third embodiment of the present invention.

Although the spacer 34 is the ring-shaped projection holding the dummy transparent plate 23 over the entire circumference in the calibration device 31 of the above second embodiment, it may be three or more printed projections 35 (three projections 35-1 to 35-3 in an example shown in FIG. 10) holding at three or more positions as shown in FIG. 10. Similarly, although the spacer 44 is the ring-shaped projection supporting the white calibration member 22 over the entire circumference in the calibration device 41 of the above third embodiment, it may be three or more printed projections 45 (three projections 45-1 to 45-3 in an example shown in FIG. 11) supporting at three or more positions as shown in FIG. 11.

Next, another embodiment is described.

(Fourth Embodiment)

Figure 12A:
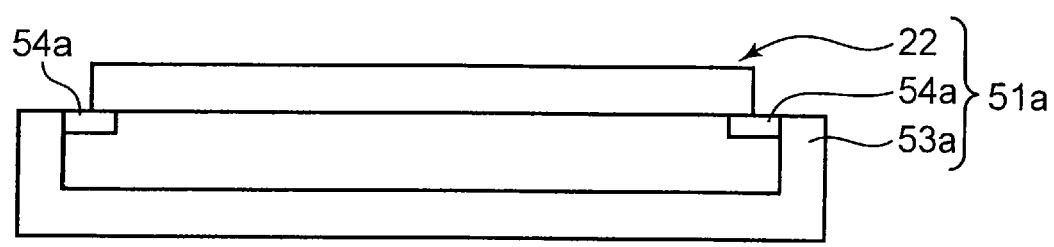
FIGS. 12A and 12B are sectional views of a calibration device according to a fourth embodiment of the present invention.
Figure 12B:
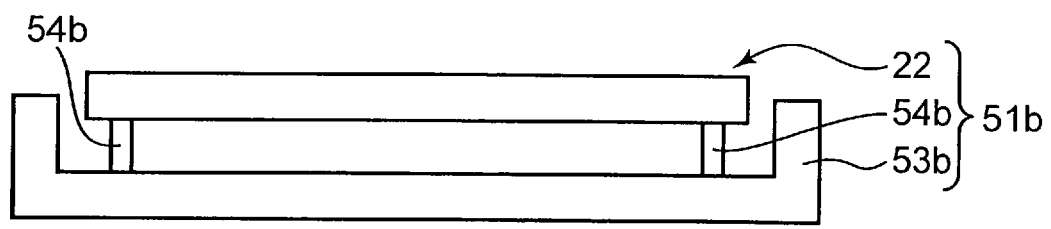

FIG. 12 are sectional views of calibration devices according to a fourth embodiment of the present invention. FIG. 12A shows a case where a spacer is arranged on an inner peripheral edge portion of a side wall surface, and FIG. 12B shows a case where a spacer is arranged on an inner peripheral edge portion of a bottom surface.

Each of the calibration devices 51 (51a, 51b) of this embodiment is composed of a white calibration member 22 and a transparent container 53 (53a, 53b) having, for example, a dish shape. This calibration device 51 is suitably used, for example, in a spectrophotometer of the top port type, and the transparent container 53 (53a, 53b) in the calibration device 51 (51a, 51b) can be used as it is at the time of measuring a specimen. In this transparent container 53 is provided a spacer 54 (54a, 54b) for forming a clearance between its inner bottom surface and the white calibration member 22. For example, as shown in FIG. 12A, the transparent container 54a is a bottomed cylinder including a bottom plate at one end, and the spacer 54a is formed as a ring-shaped projection along an inner peripheral edge portion of a side wall surface at the other end. For example, as shown in FIG. 12B, the transparent container 54b is a bottomed cylinder including a bottom plate at one end, and the spacer 54b is formed as a ring-shaped projection along an inner peripheral edge portion of the bottom surface of the transparent container 54b. In the case of white calibration, the white calibration member 22 is placed on the spacer 54 (54a, 54b).

Although the spacer 54 (54a, 54b) is the ring-shaped projection also in this fourth embodiment, it may be three or more printed projections holding at three or more positions.

Next, another embodiment is described.

(Fifth Embodiment)

Although the calibration device 21, 31, 41 or 51 is used in the optical characteristic measuring apparatus of the so-called top port type in the first to fourth embodiments, the calibration devices 21, 31, 41 and 51 of the respective embodiments can be applied to optical characteristic measuring apparatuses of arbitrary types such as optical characteristic measuring apparatuses each including a measuring port on a side surface of its main body and optical characteristic measuring apparatuses of the handy type. As an example, there is described a case where a calibration device including a spacer is applied to an optical characteristic measuring apparatus of the handy type.

Figure 13A:
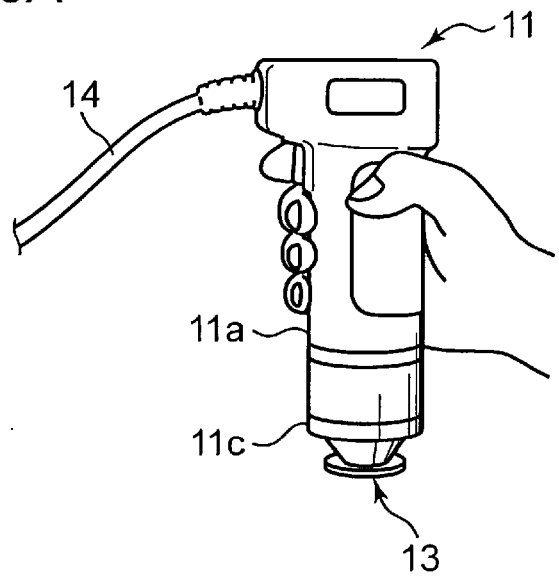
FIGS. 13A and 13B are views showing an optical characteristic measuring apparatus of the handy type employing a calibration device according to a fifth embodiment of the present invention.
Figure 13B:
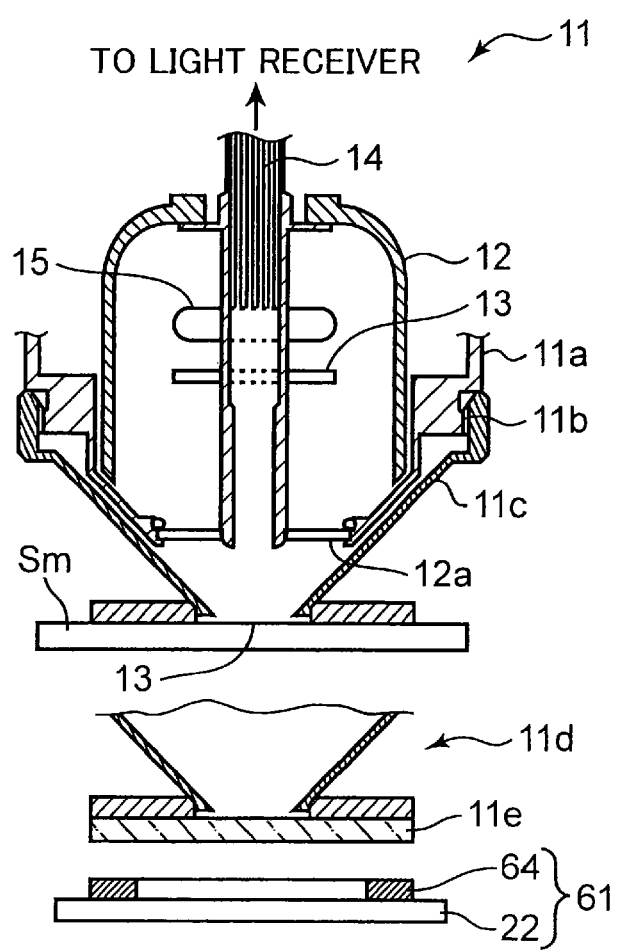
Figure 14:
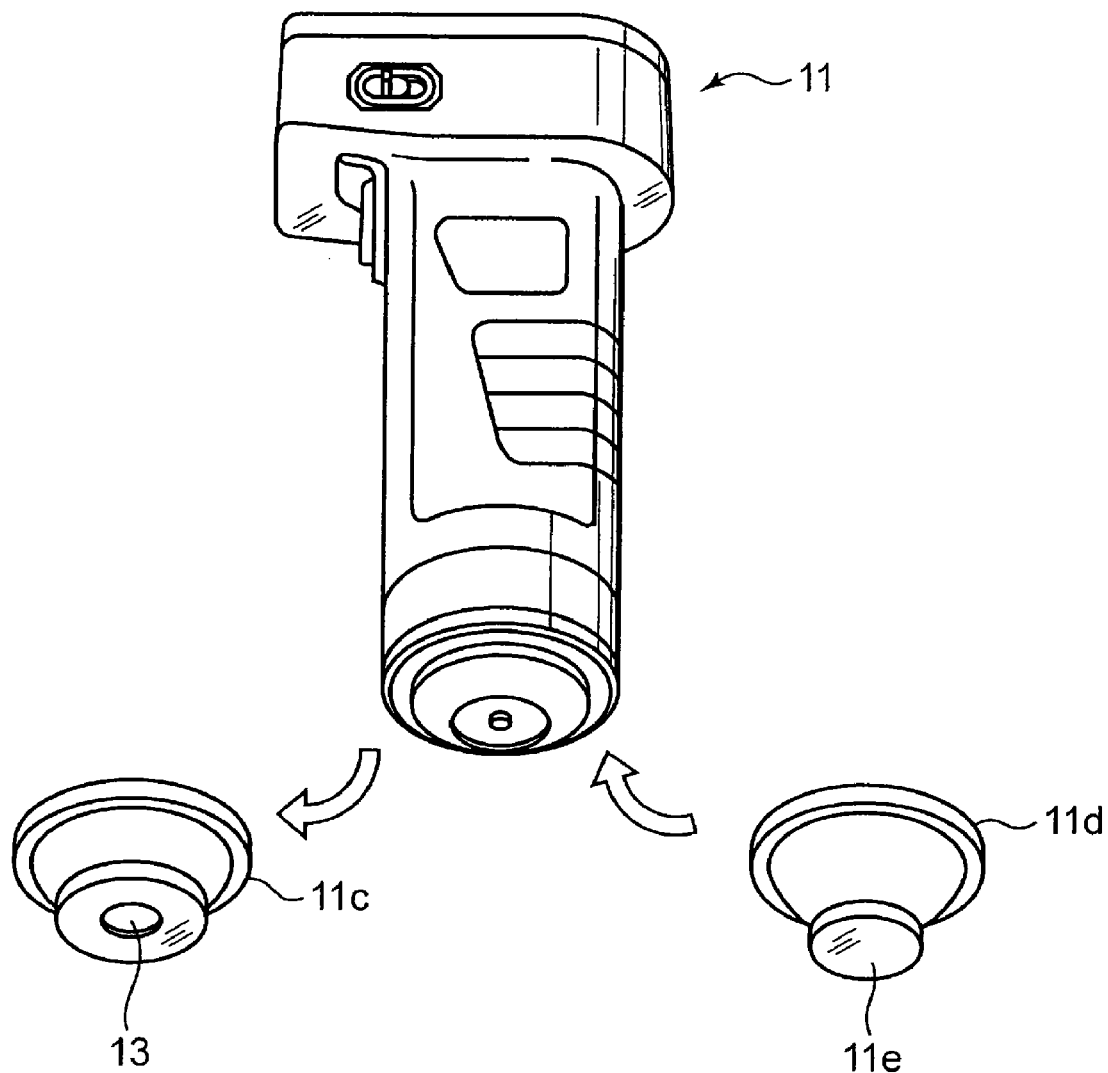
FIG. 14 is a view showing a state of exchanging a normal light blocking tube and a light blocking tube with a glass plate in the optical characteristic measuring apparatus of the handy type according to the fifth embodiment of the present invention.
Figure 15:
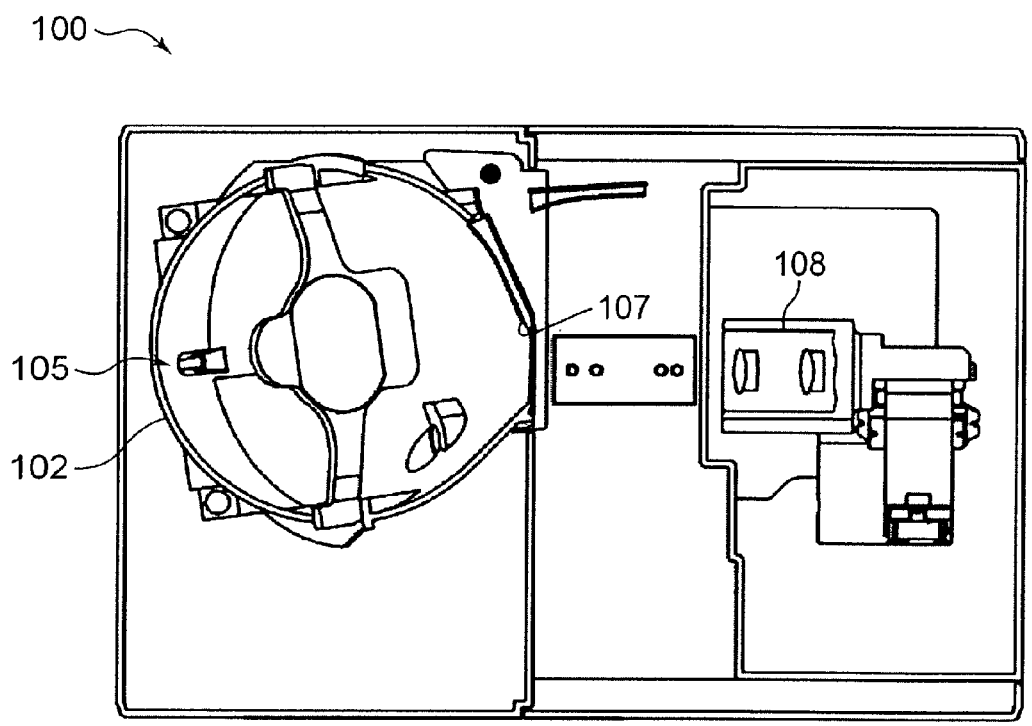
FIG. 15 is a horizontal sectional view showing a structure of a spectrophotometer of the top port type according to a background art.
Figure 16:
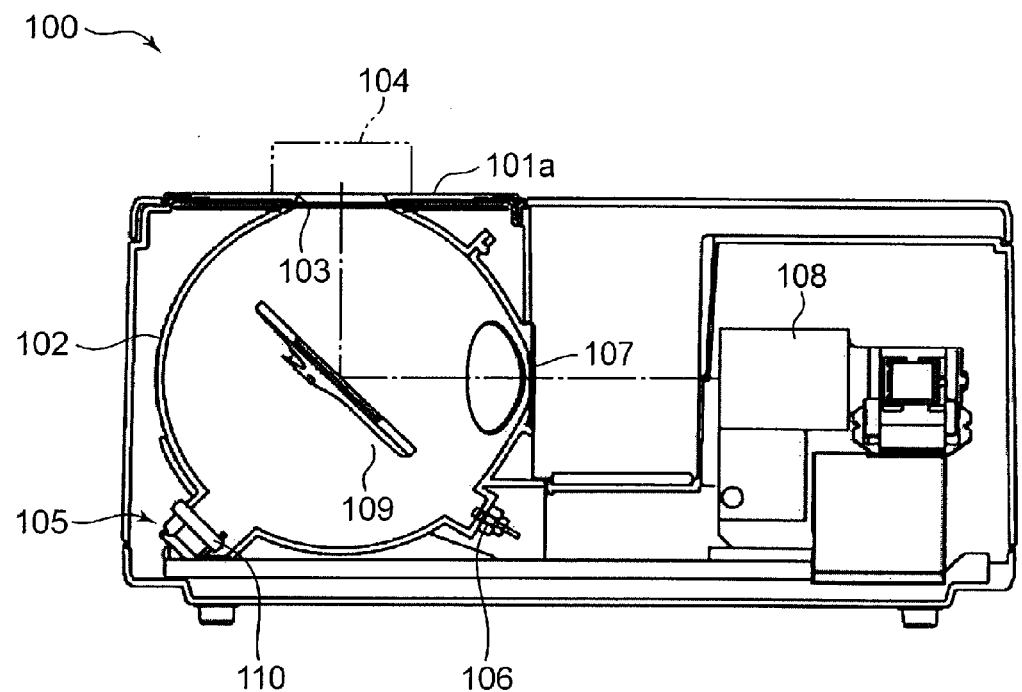
FIG. 16 is a vertical sectional view showing a structure of the spectrophotometer shown in FIG. 15.
Figure 17:
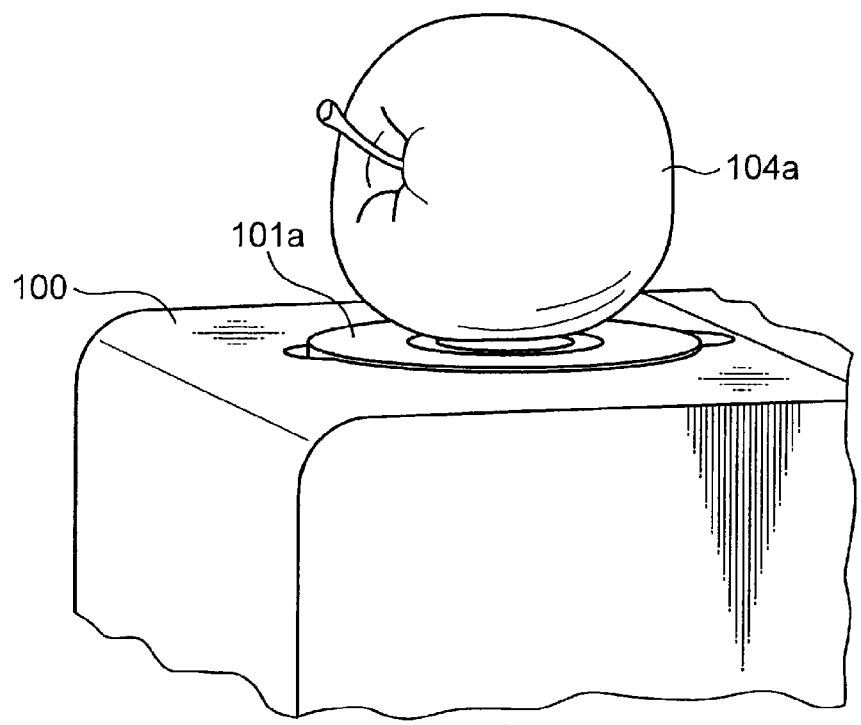
FIG. 17 is a perspective view showing an example of a measurement method of the spectrophotometer shown in FIG. 15.
Figure 18:
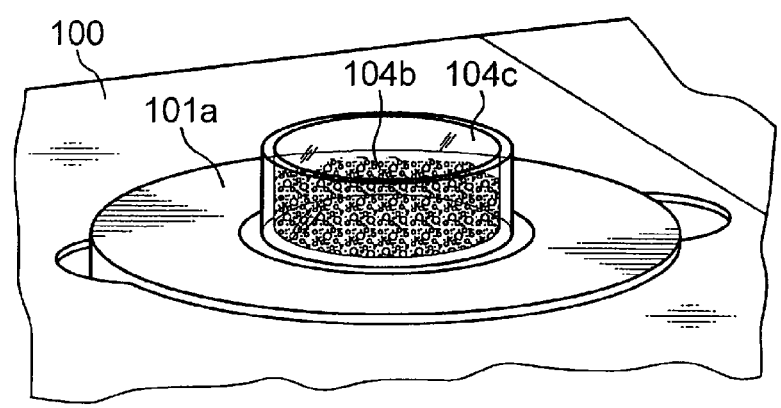
FIG. 18 is a perspective view showing another example of the measurement method of the spectrophotometer shown in FIG. 15, FIGS. 19A-C are sectional views showing the measurement method shown in FIG. 15 and a calibration method of the spectrophotometer.

FIG. 13 are views showing an optical characteristic measuring apparatus of the handy type to which a calibration device according to a fifth embodiment is applied, wherein FIG. 13A shows its external configuration and FIG. 13B shows a vertical sectional view. FIG. 14 is a view showing a state of exchanging a normal light blocking tube and a light blocking tube with a glass plate in the handy type optical characteristic measuring apparatus of the fifth embodiment.

In FIGS. 13 and 14, this optical characteristic measuring apparatus 11 of the handy type has a basic construction similar to that of the optical characteristic measuring apparatus 1 of the top port type described with reference to FIGS. 3 to 5 and measures an optical characteristic of a specimen. This optical characteristic measuring apparatus 11 is so configured that a user can grip it by hand as shown in FIG. 13A and performs a measurement with a leading end including a measuring opening 13 pressed against a specimen Sm to be measured. This optical characteristic measuring apparatus 11 of the handy type includes a housing 11a, an integrating sphere 12, a baffle 13, a measuring optical fiber cable 14, a light source 15 and a light blocking tube 11c.

The housing 11a is, for example, a cylindrical body having such an outer shape grippable by hand, houses the integrating sphere 12, the baffle 13 and the light source 15 inside, has the light blocking tube 11c mounted on one end thereof and the measuring optical fiber cable 14 extending from the other end thereof. The light blocking tube 11c has a conical shape whose diameter gradually decreases from a mounting end portion on the housing 11a toward a leading end portion, the mounting end portion thereof is fixed to one end of the housing 11a by being engaged with an externally threaded portion 11b for mounting the light blocking tube, the measuring opening 13 is formed in the leading end portion, and a annular-shaped thin flange is formed along the outer periphery of the measuring opening 13 so that the optical characteristic measuring apparatus 11 can be pressed against the specimen Sm without being inclined. A diffuser 12a is arranged in an opening of the integrating sphere 12.

Illumination light emitted from the light source 15 is scattered and reflected in the integrating sphere 12. This scattered and reflected illumination light and illumination light directly reaching from the light source 15 are irradiated to a surface of the specimen Sm through the measuring opening 13 of the light blocking tube 11c via the diffuser 12a. The illumination light reflected from this specimen Sm is incident on the measuring optical fiber cable 14 through an opening formed in the diffuser 12a and guided to an unillustrated light receiver by this measuring optical fiber cable 14.

With such an optical characteristic measuring apparatus 11 of the handy type, at the time of measuring a specimen such as powder, a transparent member for covering the measuring opening 13 is mounted so that the specimen does not enter the apparatus 11 through the measuring opening 13. More specifically, as shown in FIG. 14, the light blocking tube 11c is replaced by a light blocking tube 11d with a glass plate including a transparent plate 11e for covering the measuring opening 13. In such a case, a calibration device 61 including a white calibration plate 22 and a ring-shaped spacer 64 is used for white calibration prior to the measurement and the light blocking tube 11d with the glass plate has the transparent member 11e pressed against the spacer 64 and is pressed against the white calibration member 22 via the spacer 64 as shown in FIG. 13B. The spacer 64 may be separate from the white calibration member 22 as in FIG. 1 or may be integral to the white calibration member 22 by being formed, for example, by printing as in FIGS. 9 and 11. Note that the spacer 64 may be formed on the transparent member 11e as in FIGS. 7 and 10.

Since this construction also prevents adhesion (or contact) of the white calibration member 22 and the transparent member 11e by ensuring a specified clearance between the two, more accurate white calibration can be performed by preventing formation of an interference pattern.

This specification discloses the aforementioned arrangements. The following is a summary of the primary arrangements of the embodiments.

A calibration device according to one aspect is the one used for white calibration of an optical characteristic measuring apparatus for measuring an optical characteristic of a specimen arranged to close a measuring opening and includes a white calibration member and a spacer interposed between the white calibration member and a transparent member at a time of calibration performed prior to a measurement using the transparent member for closing the measuring opening and using the white calibration member and the transparent member in combination. Preferably, in this calibration device, the spacer is a ring along an outer peripheral edge portion of the white calibration member. Further preferably, in this calibration device, the transparent member is a dish-shaped transparent container and the spacer is a projection formed in the transparent container.

A calibration device according to another aspect is the one used for white calibration of an optical characteristic measuring apparatus for measuring an optical characteristic of a specimen arranged to close a measuring opening and includes a white calibration member, a dummy transparent plate used in combination with the white calibration member and formed to have the same material and thickness as a transparent member at a time of calibration performed prior to a measurement using the transparent member for closing the measuring opening, and a spacer to be interposed between the white calibration member and the dummy transparent plate. Preferably, in this calibration device, the spacer is a ring along an outer peripheral edge portion of the white calibration member.

According to another aspect, in these above calibration devices, the spacer is preferably a projection formed by printing.

According to another aspect, in these above calibration devices, the spacer is preferably a projection formed by printing on the dummy transparent plate.

According to another aspect, in these above calibration devices, a clearance between the transparent member and the white calibration member obtained by the spacer is 7 μm or more.

According to another aspect, in these above calibration devices, the spacer is black in color.

An optical characteristic measuring system according to another aspect includes any one of these above calibration devices and an optical characteristic measuring apparatus formed with the measuring opening, wherein the calibration device is used for white calibration of the optical characteristic measuring apparatus in the case of performing white calibration.

The optical characteristic measuring apparatus is formed with the measuring opening and measures an optical characteristic such as color of a specimen arranged to close the measuring opening. It can be used as a colorimeter for measuring the color of a food and enables measurements using a transparent member enabling measurements of, for example, granules, powders, liquids and the like and measurements of, for example, large fruits without using the transparent member.

In the calibration device used for white calibration of the optical characteristic measuring apparatus in which such a transparent member can be used, the spacer is interposed between the white calibration member and the transparent member when the transparent member is used in combination with the white calibration member.

Thus, using one type of white calibration member, it is possible to perform calibration using only the white calibration member and calibration using the white calibration member and the transparent member in combination. In addition, since the spacer ensures a specified clearance between the white calibration member and the transparent member to prevent adhesion (or contact) of the two when the white calibration member is used in combination with the transparent member, more accurate white calibration can be performed by preventing formation of an interference pattern.

The present invention has been appropriately and sufficiently described above to be expressed by way of embodiments with reference to the drawings, but it should be appreciated that a person skilled in the art can easily modify and/or improve the above embodiments. Accordingly, a modified embodiment or improved embodiment carried out by the person skilled in the art should be interpreted to be embraced by the scope as claimed unless departing from the scope as claimed.

What is claimed is:

1. A calibration device used for white calibration of an optical characteristic measuring apparatus having a measuring opening through which an optical characteristic of a specimen is measured, said calibration device comprising:
   a white calibration member; and
   a spacer configured to be placed between the white calibration member and a transparent member which covers the measuring opening at a time of white calibration for a measurement using the transparent member.

2. The calibration device as defined in claim 1, wherein the white calibration member has a circular shape and the spacer has a ring shape along the outer edge of the white calibration member.

3. The calibration device as defined in claim 1, wherein the spacer is formed as one or plural printed pattern(s) on the white calibration member.

4. The calibration device as defined in claim 1, wherein the transparent member is a dish-shaped container, and the spacer is formed as one or plural projection(s) inside thereof.

5. The calibration device as defined in claim 1, wherein a clearance between the transparent member and the white calibration member obtained by the spacer is equal to or more than 7 μm.

6. The calibration device as defined in claim 1, wherein the spacer is black in color.

7. An optical characteristic measuring system using the calibration device as defined in claim 1, said optical characteristic measuring system comprising:
   a light source for emitting light; and
   a light receiver for receiving light reflected from a specimen through the transparent member at the time of measurement using the transparent member, and for receiving light reflected from the white calibration member through the transparent member at the time of white calibration performed for said measurement using the transparent member.

8. A calibration device used for white calibration of an optical characteristic measuring apparatus having a measuring opening through which an optical characteristic of a specimen is measured, said calibration device comprising:
   a white calibration member;
   a dummy transparent plate configured to be placed for covering the measuring opening at a time of white calibration for a measurement using a transparent member which covers the measuring opening; and
   a spacer configured to be placed between the white calibration member and the dummy transparent plate at the time of white calibration using the dummy transparent plate;
   the material and thickness of the dummy transparent plate being same as those of the transparent member.

9. The calibration device as defined in claim 8, wherein the white calibration member has a circular shape and the spacer has a ring shape along the outer edge of the white calibration member.

10. The calibration device as defined in claim 8, wherein the spacer is formed as one or plural printed pattern(s) on the white calibration member.

11. The calibration device as defined in claim 8, wherein the spacer is formed as one or plurality printed pattern(s) on the dummy transparent plate.

12. The calibration device as defined in claim 8, wherein a clearance between the transparent member and the white calibration member obtained by the spacer is equal to or more than 7 μm.

13. The calibration device as defined in claim 8, wherein the spacer is black in color.

14. An optical characteristic measuring system using the calibration device as defined in claim 8, said optical characteristic measuring system comprising:
   a light source for emitting light; and
   a light receiver for receiving light reflected from a specimen through the transparent member at the time of measurement using the transparent member, and for receiving light reflected from the white calibration member through the dummy transparent plate at the time of white calibration performed for said measurement using the transparent member.

15. A calibration device used for white calibration of an optical characteristic measuring apparatus having a measuring opening through which an optical characteristic of a specimen is measured, said calibration device comprising:
   a dummy transparent plate configured to be placed between the measuring opening and a white calibration member at a time of white calibration for a measurement using a transparent member which covers the measuring opening; and
   a spacer configured to be placed between the white calibration member and the dummy transparent plate at the time of white calibration using the dummy transparent plate;
   the material and thickness of the dummy transparent plate being same as those of the transparent member.

16. The calibration device as defined in claim 15, wherein the dummy transparent plate has a circular shape and the spacer has a ring shape along the outer edge of the white calibration member.

17. The calibration device as defined in claim 15, wherein the spacer is formed as one or plural printed pattern(s) on the dummy transparent plate.

18. The calibration device as defined in claim 15, wherein a clearance between the transparent member and the white calibration member obtained by the spacer is equal to or more than 7 μm.

19. The calibration device as defined in claim 15, wherein the spacer is black in color.

20. An optical characteristic measuring system using the calibration device as defined in claim 15, said optical characteristic measuring system comprising:
   a light source for emitting light; and
   a light receiver for receiving light reflected from a specimen through the transparent member at the time of measurement using the transparent member, and for receiving light reflected from a white calibration member through the dummy transparent plate at the time of white calibration performed for said measurement using the transparent member.

\* \* \* \* \*